US009336380B2

(12) United States Patent
Spektor et al.

(10) Patent No.: US 9,336,380 B2
(45) Date of Patent: May 10, 2016

(54) APPLYING ACTIVITY ACTIONS TO FREQUENT ACTIVITIES

(75) Inventors: Daron Spektor, Seattle, WA (US); Youngha Joo, Seattle, WA (US); Steven Paul Miale, Bothell, WA (US); Federico Emmanuel Gomez Suarez, Redmond, WA (US)

(73) Assignee: Microsoft Technology Licensing LLC, Redmond, WA (US)

(*) Notice: Subject to any disclaimer, the term of this patent is extended or adjusted under 35 U.S.C. 154(b) by 102 days.

(21) Appl. No.: 12/968,361

(22) Filed: Dec. 15, 2010

(65) Prior Publication Data
US 2012/0159564 A1    Jun. 21, 2012

(51) Int. Cl.
*G06F 21/50* (2013.01)
*H04L 29/06* (2006.01)
*H04L 29/08* (2006.01)

(52) U.S. Cl.
CPC ............... *G06F 21/50* (2013.01); *H04L 63/08* (2013.01); *H04L 67/22* (2013.01)

(58) Field of Classification Search
CPC ........................................................ G06F 21/50
USPC .......................................... 726/27, 26, 31, 2
See application file for complete search history.

(56) References Cited

U.S. PATENT DOCUMENTS

| | | | | |
|---|---|---|---|---|
| 5,101,424 A | * | 3/1992 | Clayton et al. | 379/10.03 |
| 6,892,347 B1 | * | 5/2005 | Williams et al. | 715/201 |
| 6,996,576 B2 | * | 2/2006 | Vos et al. | 707/688 |
| 7,139,748 B1 | | 11/2006 | Mills et al. | |
| 7,660,865 B2 | | 2/2010 | Hulten et al. | |
| 8,060,782 B2 | * | 11/2011 | Caspi et al. | 714/26 |
| 8,271,457 B2 | * | 9/2012 | Vos et al. | 707/688 |

(Continued)

FOREIGN PATENT DOCUMENTS

| | | |
|---|---|---|
| CN | 1510579 A | 7/2004 |
| CN | 101164333 A | 4/2008 |

OTHER PUBLICATIONS

Atterer et al.; Knowing the user's every move: user activity tracking for website usability evaluation and implicit interaction; Published in: Proceeding WWW '06 Proceedings of the 15th international conference on World Wide Web; 2006; pp. 203-212; ACM Digital Library.* Lee et al.; A data mining framework for building intrusion detection models; Published in: Security and Privacy, 1999, Proceedings of the 1999 IEEE Symposium on; Date of Conference: 1999; pp. 120-132; IEEE Xplore.*

(Continued)

*Primary Examiner* — Bradley Holder
(74) *Attorney, Agent, or Firm* — Bryan Webster; Katherine Drakos; Micky Minhas (57) ABSTRACT

Activities of users of a service often involve one or more resources, such as uploading or downloading files in a file system of an FTP server. The activities of the users may be tracked and recorded in an activity log in order to identify frequently performed activities involving particular resources, and for such frequently performed activities, one or more activity actions may be performed. For example, malicious users may upload or utilize an equivalent set of assets stored in several accounts. The frequency of these undesirable activities may be identified, and an activity action may be automatically applied to the users (e.g., banning accounts), resources (e.g., deleting assets), and/or activities (e.g., blocking access to the resources). Conversely, desirable activities involving particular resources may be similarly detected, and the activity action applied to such desirable activities may involve reporting the desirable activity to an administrator of the service.

20 Claims, 8 Drawing Sheets

(56) References Cited

U.S. PATENT DOCUMENTS

| | | | |
|---|---|---|---|
| 2002/0087587 A1* | 7/2002 | Vos et al. | 707/203 |
| 2002/0089528 A1* | 7/2002 | Hay et al. | 345/712 |
| 2002/0091672 A1* | 7/2002 | Vos et al. | 707/1 |
| 2002/0103747 A1* | 8/2002 | Lawrence | 705/38 |
| 2003/0115137 A1* | 6/2003 | Rowe | 705/39 |
| 2003/0167275 A1* | 9/2003 | Rjaibi | 707/101 |
| 2004/0068627 A1* | 4/2004 | Sechrest et al. | 711/158 |
| 2004/0073617 A1 | 4/2004 | Milliken et al. | |
| 2004/0205010 A1* | 10/2004 | Hamer et al. | 705/35 |
| 2006/0036693 A1* | 2/2006 | Hulten et al. | 709/206 |
| 2007/0078676 A1* | 4/2007 | Hamer et al. | 705/1 |
| 2007/0299631 A1* | 12/2007 | Macbeth et al. | 702/187 |
| 2008/0059461 A1 | 3/2008 | Brock et al. | |
| 2008/0263507 A1* | 10/2008 | Chang et al. | 717/104 |
| 2009/0089279 A1 | 4/2009 | Jeong et al. | |
| 2009/0099861 A1 | 4/2009 | Aziz et al. | |
| 2010/0070432 A1* | 3/2010 | Hamer et al. | 705/36 R |
| 2010/0211645 A1 | 8/2010 | Wang et al. | |
| 2010/0293016 A1* | 11/2010 | Spektor et al. | 705/7 |
| 2011/0131124 A1* | 6/2011 | Hamer et al. | 705/35 |
| 2011/0219315 A1* | 9/2011 | Bier et al. | 715/752 |

OTHER PUBLICATIONS

Damiani; et al., "An Open Digest-based Technique for Spam Detection"-Published Date: 2004 http://citeseerx.ist.psu.edu/viewdoc/download?doi=10.1.1.61.6185&rep=rep1&type=pdf.
Kolcz; et al., "The Impact of Feature Selection on Signature-Driven Spam Detection"—Published Date: 2004 http://citeseerx.ist.psu.edu/viewdoc/download?doi=10.1.1.69.1600&rep=rep1&type=pdf.
Second Chinese Office Action cited in Chinese Application No. 201110419954.2 dated Aug. 27, 2014, 5 pgs.
Chinese Search Report cited in Chinese Application No. 201110419954.2 dated Feb. 7, 2014, 2 pgs.
Reply/Claims first Chinese Office Action cited in Chinese Application No. 201110419954.2 dated May 4, 2014, 5 pgs.
Reply/Claims second Chinese Office Action cited in Chinese Application No. 201110419954.2 dated Nov. 18, 2014, 5 pgs.
Third Chinese Office Action cited in Chinese Application No. 201110419954.2 dated Mar. 18, 2015, 3 pgs.
Reply/Claims third Chinese Office Action cited in Chinese Application No. 201110419954.2 dated Jun. 2, 2015, 5 pgs.
Chinese Notice of Allowance cited in Chinese Application No. 201110419954.2 dated Jul. 29, 2015, 2 pgs.

* cited by examiner

APPLYING ACTIVITY ACTIONS TO FREQUENT ACTIVITIES

BACKGROUND

Within the field of computing, many scenarios involve a set of users who may perform various activities involving one or more resources. As a first example, users of a network file system may access various files, such as creating, reading, altering, deleting, naming or renaming, and executing various files. As a second example, users of a media sharing service may upload, download, view, or share with other users one or more media objects, such as documents, images, and audio and/or video recordings. As a third example, users of a social media network may author messages referencing various resources, such as internet-accessible resources identified by a uniform resource identifier (URI). The resources involved in such activities may be stored by a device (e.g., a file server permitting users to perform various activities on files stored therein). Alternatively, users may perform activities involving resources that are not stored by the device, such as URIs of resources stored by other devices (e.g., references to external resources, such as web pages provided by a website or objects stored by other object servers).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In scenarios where users perform activities involving one or more resources, it may be desirable to identify frequent activities. Some such activities may comprise desirable or undesirable activities (e.g., sharing an unrestricted recording of a song with a friend, or sharing a restricted recording in a manner contrary with the restriction). Accordingly, it may be desirable to configure a device (such as a file server, a media sharing service, or a webserver) to monitor the activities of users to detect frequent activities that involve a particular set of resources (e.g., frequent uploads of a particular file or set of files stored by a fileserver; frequent viewing of a particular media item shared by a media sharing service; and/or frequent referencing of a particular resource within messages sent to other users). Such monitoring may be advantageous in order to apply an activity action in response to a frequent activity. As a first example, if an embodiment detects among a set of users a frequent and desirable activity, the embodiment may automatically identify the activity as popular among users. As a second example, if an embodiment detects among a set of users a frequent but undesirable activity (e.g., sending spam email messages or email messages including or referencing malware), the embodiment may automatically restrict the activity (e.g., by blocking the performance of the activity), the user(s) performing the activity (e.g., by suspending or banning users), and/or the resource(s) involved in the activity (e.g., by blocking access to or deleting such resource(s)). In this manner, an embodiment of these techniques may, automatically or with the assistance of a user, apply suitable activity actions in response to frequent activities performed by the users involving one or more resources.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a set of users who may perform one or more activities involving one or more resources. As a first example, users of a file system (such as a set of users of the local file system of a computer, a set of users accessing files in a network file system, or a set of users accessing a remote file server, such as a File Transfer Protocol (FTP) server or a webserver) may perform various activities relating to one or more files, such as creating, reading, altering, deleting, naming or renaming, relocating, or executing one or more files. As a second example, users of a media sharing service (such as an image database, a database of documents, or an audio and/or video streaming service) may perform various activities relating to media objects, such as uploading, downloading, streaming, or deleting a media object. As a third example, users of a social media network may perform various activities relating to objects shared with other users, such as posting public or private messages addressed to one or more contacts that may include a reference (such as a uniform resource identifier (URI)) to one or more objects, such as a web page of a website. In these and other examples, a device offering a service to such users may be configured to receive requests from the users to perform various activities, and may perform such activities with respect to one or more resources on behalf of the users.

Figure 1:
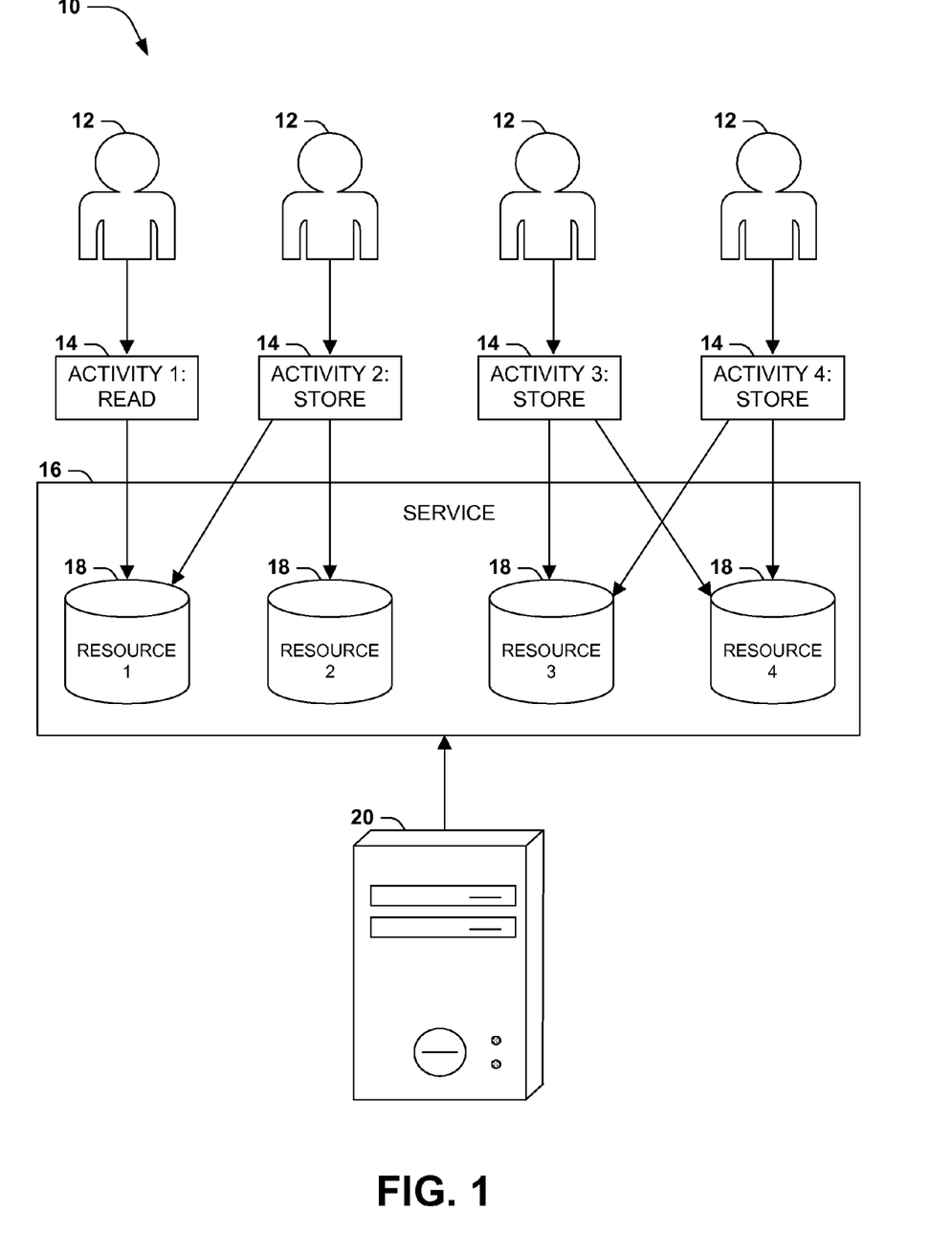
FIG. 1 is an illustration of an exemplary scenario featuring a set of users performing a set of activities involving various resources of a service.

FIG. 1 presents an illustration of an exemplary scenario 10 featuring a set of users 12 of a service 16 comprising a set of resources 18, such as a set of files provided by a file system or FTP server, a set of media objects provided by a media sharing server, or a set of documents provided by a document server. The service 16 may be provided by a device 20, such as a server process executing on a workstation computer, a desktop computer, a notebook computer, or a mobile device. The users 12 of this service 16 may perform one or more activities 14 involving one or more resources 18. For example, a first user 12 may perform a read activity 14 in order to access a first resource 18; a second user 12 may perform a store operation to store both the first resource 18 and the second resource 18; and a third and fourth user 12 may perform a sore operation to store a third resource 18 and a fourth resource 18 in the service 16. The device 20 may be configured to record such activities 14, e.g., in a server log, where each record identifies particular traits about the activity 14, including the user 12 (such as an internet protocol (IP) address from which the user 12 issued the request to perform the activity 14) and/or the resources 16 involved in the action 14. In this manner, the device 20 offering the service 16 may receive, evaluate, and fulfill requests to perform activities 14 on the resources 18 comprising the service 16.

The exemplary scenario 10 of FIG. 1 involves the recording of activities 14. These records may be examined, e.g., by an administrator of the device 20, in order to monitor the interactions of users 12 with the service 16. This monitoring may facilitate the administrator in improving the quality of the service 16 (e.g., by identifying performance bottlenecks or opportunities for upgrading the device 20) and/or in noticing and evaluating undesirable activities by malicious users (e.g., by tracking the activities 14 performed on the resources 18 of the service 16 by the malicious user 12). However, in many scenarios (such as a conventional webserver), the device 20 is not configured to evaluate the activity 14 requested by the user 12. Rather, the device 20 may be configured only to record the activity 14 and to perform the requested action on behalf of the user 12.

However, it may be desirable to configure the device 20 to evaluate the patterns of activities 14 performed with respect to one or more resources 18, and to automatically perform one or more actions in response to a frequently performed activity 14 involving a particular set of resources 18. The activities 14 may comprise a desirable activity, such as users 12 sharing a popular media object in a media sharing service, or undesirable activity, such as users 12 uploading an objectionable content item (such as an inappropriate photo) or a malicious piece of software, such as a propagating virus or worm. The device 20 may therefore be configured to, upon detecting a particularly frequent activity 14 involving a particular set of resources 18, automatically perform an action in response to the activity 14. As a first example, for a desirable activity 14 such as a frequent sharing of a popular media object, the device 20 may perform an action that encourages the activity 14, such as adding the media object to a list of popular media objects stored by the service 16, improving performance by allocating additional resources for the sharing of the media object (e.g., storing the media object in a high-performance cache), or rewarding the user(s) 12 performing the activity 14. Conversely, for an undesirable activity 14, such as the uploading or accessing of an undesirable object, the device 20 may detect the frequency of such activities 14 and may apply one or more activity actions that discourage the undesirable activity 14. Such activity actions may be performed upon the users 12 performing the activity 14 (e.g., warning or banning the users 12 performing the activity 14), the resources 18 involved in the activity 14 (e.g., censoring, restricting access to, replacing, or deleting the resource 18), and/or the activity 14 (e.g., blocking attempts to perform the activity 14 or degrading the performance of the device 20 in performing the activity 14). Such activity actions may also be applied proactively, presently, retroactively; e.g., for an activity 14 involving the uploading of an undesirable resource 18, the device 20 may retroactively ban the accounts of users 12 who have previously performed the activity 14, may ban the users 12 currently performing the activity 14, and/or may monitor future requests of the users 12 in order to ban the account of a user 12 requesting the activity 14 promptly upon receiving the request. In these and other scenarios, it may be desirable to configure a device 20 to detect frequently performed activities 14 by users 12 involving particular resources 18 of the service 16, and to perform one or more activity actions in response to such activities 14.

Figure 2:
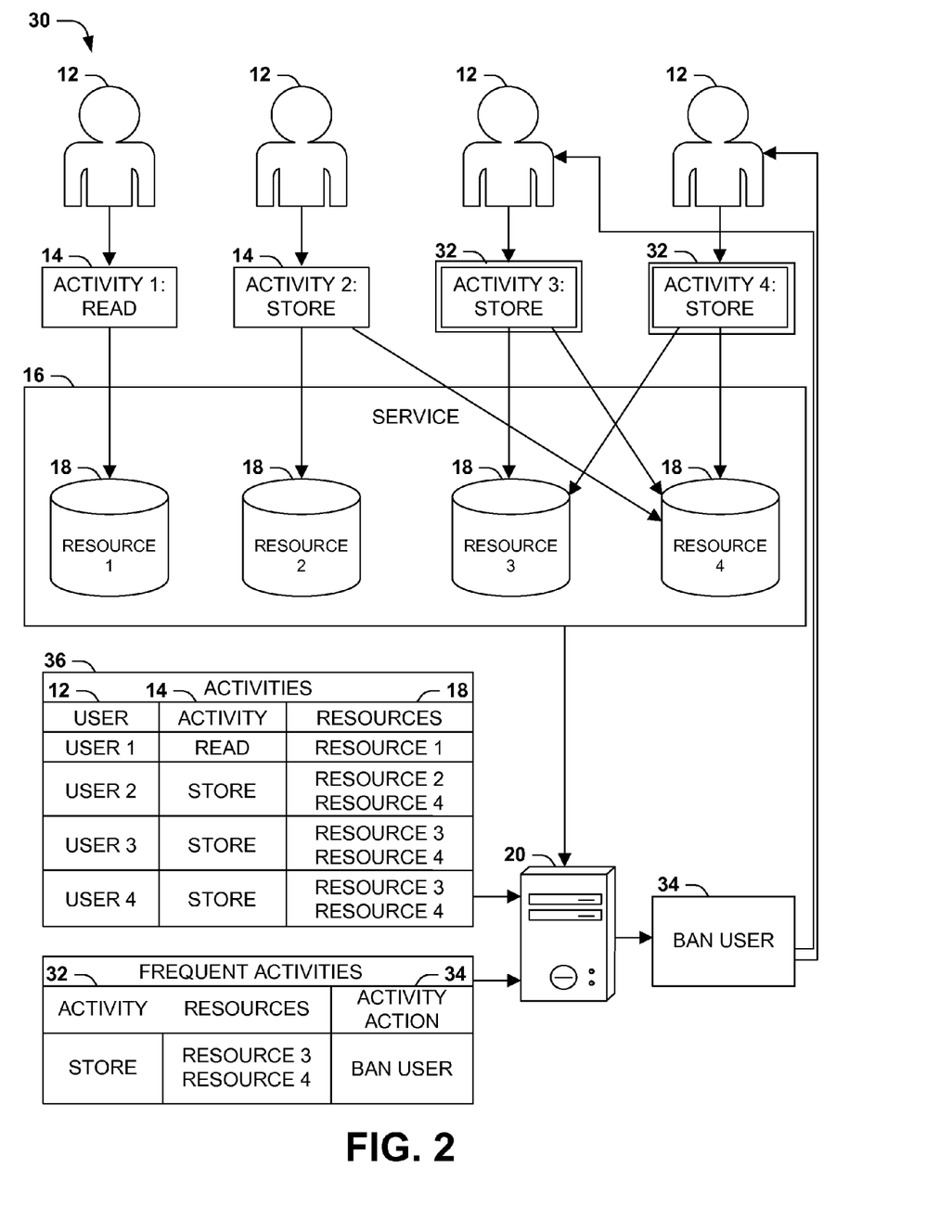
FIG. 2 is an illustration of an exemplary scenario featuring a device configured to detect frequent activities of users involving various resources of a service, and the automated application of activity actions thereto, in accordance with the techniques presented herein.

FIG. 2 presents an exemplary scenario 30 featuring a device 20 configured to monitor the activities 14 of users 12 of a service 16. In this exemplary scenario 30, a set of users 12 utilize a service 16 provided by a device 20 by performing activities 14 involving one or more resources 18 provided by the service 16. For example, a first user 12 may perform a "read" activity 14 involving a first resource 18; a second user 12 may perform a "store" activity 14 involving a second resource 18 and a fourth resource 18; and a third user 12 and a fourth user 12 may each perform a "store" activity 14 involving a third resource 18 and a fourth resource 18. Particular activities 14 that may be requested by a user 12 involving one or more resources 18 may be the subject of attention by an administrator of the service 16. For example, the third resource 18 may comprise an encryption cracking tool, and the fourth resource 18 may comprise a user account database of the service 16. The second user 12 may access the fourth resource 18 in an appropriate or unsuspicious manner (e.g., to create a new user account in an authorized manner), but the third user 12 and the fourth user 12 may, by performing an activity 14 involving both the third resource 18 and the fourth resource 18, raise cause for suspicion of an undesirable activity (e.g., decrypting the user database of the service 16 in order to corrupt the set of user accounts). Moreover, the frequency of requests by users 12 to perform this activity 14 involving these resources 18 may be too numerous to allow an administrator of the device 20 to handle on a non-automated basis.

In this and other scenarios, the device 20 may be configured to, in accordance with the technique presented herein, identify frequent activities 32 involving particular resources 18 and perform one or more activity actions 34 relating thereto. For example, upon receiving a request from a user 12 to perform an activity 14 involving one or more resources 18, the device 20 may create a record in an activity log 36 that denotes the user 12, the activity 14 requested, and the resources 18 involved in the activity 14. The device 20 may then evaluate the activity log 36 to identify frequent activities 32. For example, the "store" activity 14 of the third user 12 and the fourth user 12 may qualify as a frequent activity 32, and the device 20 may therefore perform one or more activity actions 34 to this frequent activity 32. In this exemplary scenario 30, the frequent activity 32 performed by the third user 12 and the fourth user 12 may comprise an undesirable activity, and the device 14 may, upon identifying the frequent activity 32, automatically perform an activity action 34 in response to the frequent activity 32. For example, an activity action 34 may be defined to ban from the service 16 the users 12 performing the frequent activity 32. This activity action 34 may be applied retroactively (e.g., after identifying that some users 12 have previously attempted to perform the frequent activity 32, the device 20 may ban users 12 who have previously performed the frequent activity 32), presently (e.g., banning users 12 who are currently performing the frequent activity 32), and/or proactively (e.g., after identifying the frequent activity 32, monitoring the activities 14 of users 12 to detect an attempt to perform the frequent activity 32 and therefore banning the user 12). In this manner, the device 20 may detect frequent activities 32 and automatically apply activity actions 34 thereto in accordance with the techniques presented herein. Moreover, the device 20 selectively applies the activity actions 34 to users 12 performing the activity 14 involving the particular resources 18. For example, the third user 12 and the fourth user 12 are subjected to the activity action 34 because the combination of the activity 14 and the involved resources 18 raises a suspicion, whereas the second user 12 performing a similar activity 14 but only involving one of these resources 18, which does not raise suspicion, is not subjected to the activity action 34. In accordance this example and the techniques presented herein, the device 20 may be capable of identifying new types of activities 14 that are involved in new patterns of attack by malicious users 12, and may, automatically and rapidly, generate new rules that defend against such attacks by applying activity actions 34 to the frequent activities 32 identified as malicious.

Figure 3:
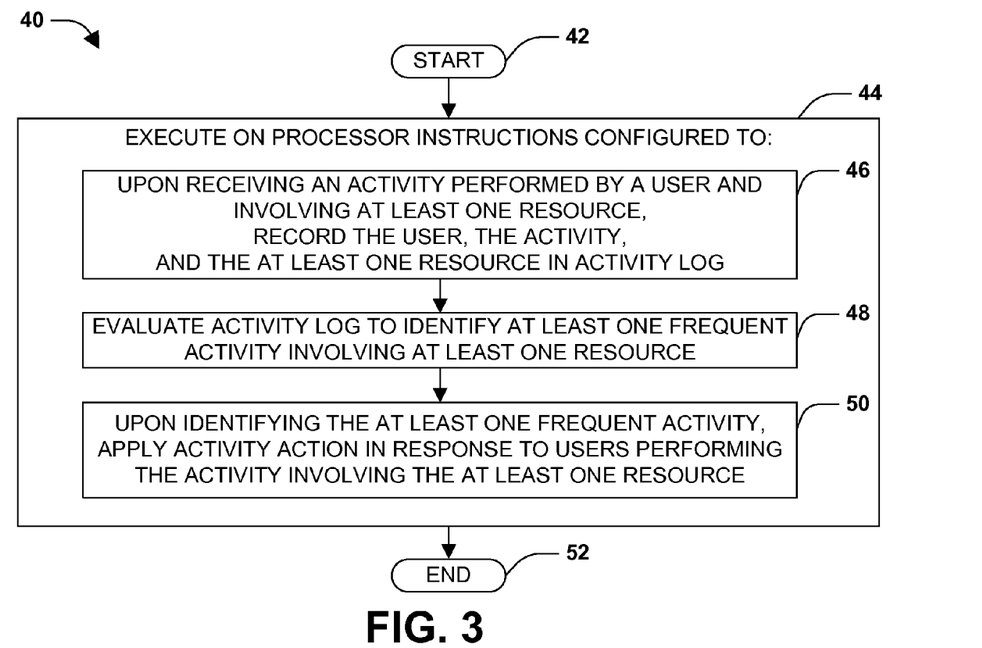
FIG. 3 is a flow chart illustrating an exemplary method of evaluating activities of users involving resources.

FIG. 3 presents a first embodiment of these techniques, illustrated as an exemplary method 40 of evaluating activities 14 of users 12 involving resources 18 (such as may comprise a particular service 16, such as a file service). This exemplary method 40 involves a device 20 having a processor and having access to an activity log 36, and may be implemented, e.g., as a set of software instructions stored in a memory component of the device 20 (e.g., system memory, a platter of a hard disk drive, a solid-state storage device, or a magnetic or optical disc) that cause the device 20 to implement the techniques presented herein. The exemplary method 40 begins at 42 and involves executing 44 the instructions on the processor. In particular, the instructions are configured to, upon detecting an activity 14 performed by a user 12 involving at least one resource 18, record 46 the user 12, the activity 14, and the at least one resource 18 in the activity log 36. The instructions are also configured to evaluate 48 the activity log 36 to identify at least one frequent activity 32 involving at least one resource 18. The instructions are also configured to, upon identifying the at least one frequent activity 32, apply 50 an activity action 18 to the users 12 performing the activity 14 involving the at least one resource 18. In this manner, the device 20 achieves the application of activity actions 18 to frequent activities 32 requested by users 12 of the service 16, and so ends at 52.

Figure 4:
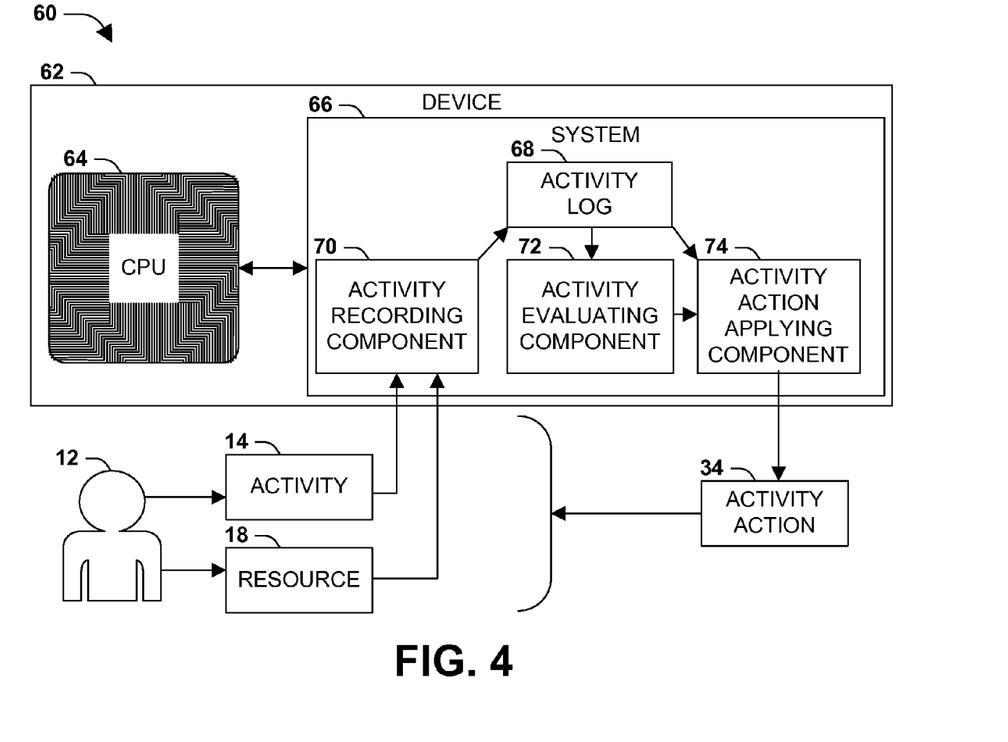
FIG. 4 is a component block diagram illustrating an exemplary system for evaluating activities of users involving resources.

FIG. 4 presents a second embodiment of the techniques presented herein, illustrated as an exemplary system 66 configured to evaluate activities 14 of users 12 involving one or more resources 18. The exemplary system 66 may involve a device 62 having a processor 64, and may be implemented, e.g., as a set of software components that interoperate to cause the processor 64 of the device 62 to perform the techniques presented herein. More particularly, the software components may comprise a set of instructions stored in a memory component of the device 62 (e.g., system memory, a platter of a hard disk drive, a solid-state storage device, or a magnetic or optical disc) that cause the processor 64 to perform a particular task, such that the software components, interoperating as provided herein, cause the device 62 to perform the techniques presented herein. In this exemplary scenario, the exemplary system 66 comprises an activity log 68, which is configured to store an activity 14 involving at least one resource 18. The exemplary system 66 also comprises an activity recording component 70, which is configured to, upon detecting an activity 14 performed by a user 12 involving at least one resource 18, record in the activity log 68 the user 12, the activity 14, and the at least one resource 18. The exemplary system 66 also includes an activity evaluating component 72, which is configured to evaluate the activity log 68 to identify at least one frequent activity 32 involving at least one resource 18. The exemplary system 66 also comprises an activity action applying component 74, which is configured to, upon identifying a frequent activity 32, apply an activity action 34 to the users 12 performing the activity 14 involving the at least one resource 18. By implementing these interoperating components, the exemplary system 66 monitors the activities 14 of the users 12 and automatically applies activity actions 34 to frequent activities 32 performed thereby.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
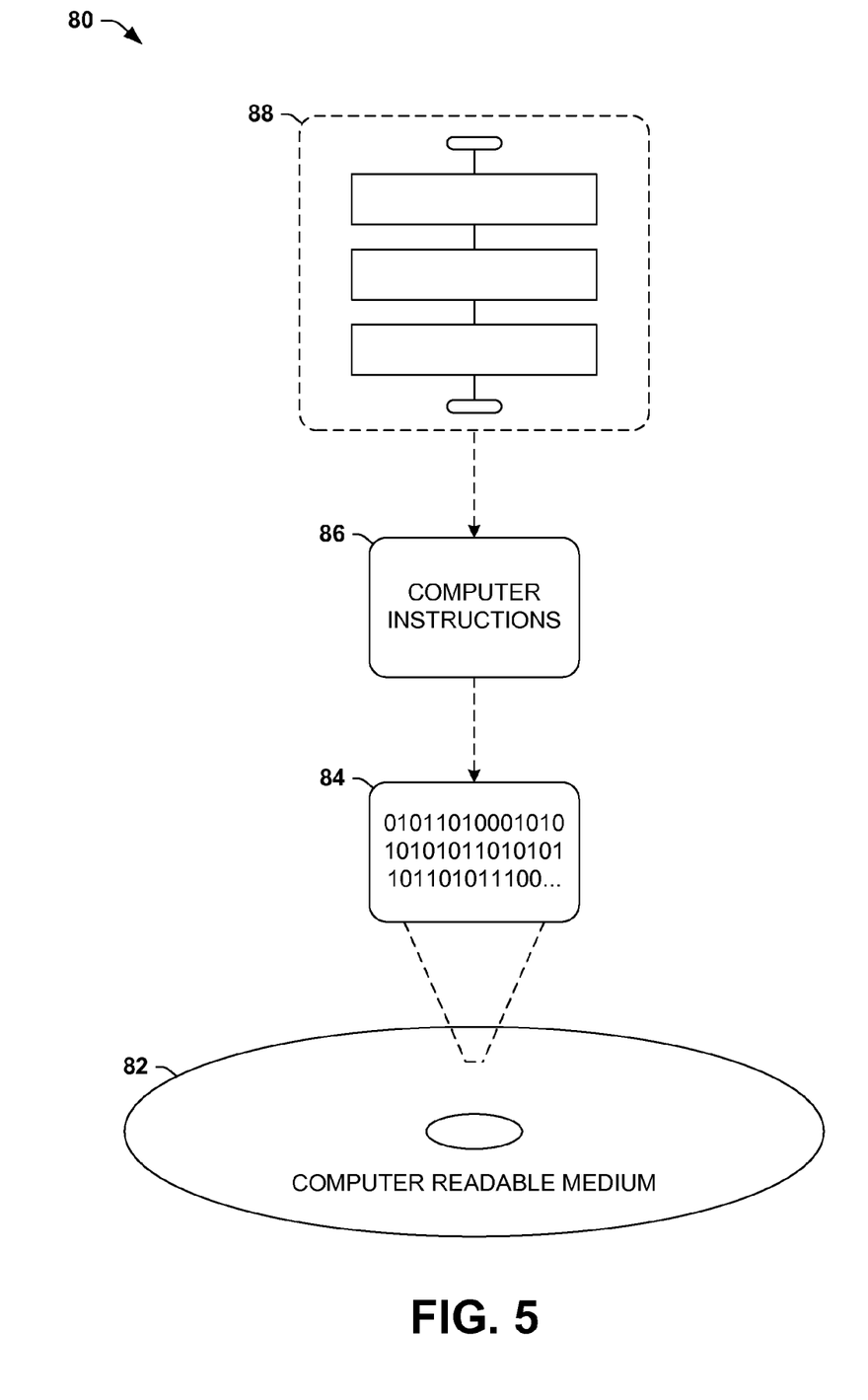
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 80 comprises a computer-readable medium 82 (e.g., a CD-R, DVD-R, or a platter of a hard disk drive), on which is encoded computer-readable data 84. This computer-readable data 84 in turn comprises a set of computer instructions 86 configured to operate according to the principles set forth herein. In one such embodiment, the processor-executable instructions 86 may be configured to perform a method of evaluating activities of users involving resources, such as the exemplary method 40 of FIG. 3. In another such embodiment, the processor-executable instructions 86 may be configured to implement a system for evaluating activities of users involving resources, such as the exemplary system 66 of FIG. 4. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 40 of FIG. 3 and the exemplary system 66 of FIG. 4) to confer individual and/or synergistic advantages upon such embodiments.

A first aspect that may vary among embodiments of these techniques relates to the scenarios wherein the techniques presented herein may be utilized. As a first example, these techniques may be utilized in relation to track and evaluate various types of activities 14 preformed on the resources 18 of various types of services 16. As a first such variation, the device 20 may comprise a data store (such as a file system or a database) storing various resources 18 (such as files or database records), and the activity 14 may involve sending a resource 18 to the service 16. As a second such variation, the device 20 may be capable of executing various instructions on behalf of a user 12, such as a compiled binary or a script, and the activity 14 may involve executing particular instructions (such as attempting to access unauthorized resources, such as reading a password file or deleting a system object). For example, these techniques may be utilized to evaluate various activities 14 performed on files of a file system, such as creating, reading, updating, deleting, naming, or relocating the file; various actions 14 performed on media objects of a media sharing service, such as uploading, downloading, streaming, commenting on, or removing a media object; and various activities 14 performed on messages of a social network, such as creating, reading, replying to, or deleting a message. Additionally, the activities 14 monitored by an embodiment may be desirable (e.g., a first user 12 sharing a media object with a second user 12), undesirable (e.g., a user 12 executing a decryption utility against an encrypted resource of the service 16), or simply interesting or unusual (e.g., users 12 frequently uploading a file of unknown contents and usage to a file server). As a second example, the device whereupon these techniques are performed may comprise a single machine, or may be distributed across multiple machines in various ways (e.g., two or more machines may be configured to store the activity log, evaluate the activities included in the activity log, and/or apply the activity actions in response to detected activities). As a third example, these techniques may be utilized to apply many types of activity actions 34 upon identifying a frequent activity 14 involving one or more particular resources 18. Such activity actions 34 may apply to the user 12 performing the activity 14 (e.g., warning the user 12 that the activity 14 is undesirable or banning the account of the user 12), to the resources 18 involved in the activity 14 (e.g., deleting resources 18 involved in an undesirable activity 14), and/or to the activity 14 (e.g., blocking attempts or requests to perform the activity 14).

A particular scenario wherein these techniques may be utilized involves a frequent tactic of malicious users 12, such as distributors of spam and malicious software such as viruses and worms, unauthorized infiltrators of computer systems, and operators of botnets of corrupted devices. Such malicious users 12 often perform malicious activities 14 by invoking a set of resources 18 stored on a service 16. For example, a spammer may store an email template, a database of targeted email addresses, and an application designed to send unsolicited bulk email messages; a distributor of malicious software may store the malicious software and a mechanism for delivering the malicious software (e.g., a corrupted user control that may exploit a vulnerability in a webserver to install malicious software); and an operator of a botnet may store a list of network addresses of co-opted devices and various objects for distributing commands to the botnet, such as an encryption key to authenticate the operator of the botnet to the co-opted devices. Such users 12 may store these assets as resources 18 within one or more independent services 16, such as a public file server, a public webserver, or a public media object server, and may utilize the bandwidth, storage, and computational capabilities of these independent services 16 to perform some or all of the actions of the malicious activities 14. However, such users 12 are often aware that authorities (including the administrators of the service 16) may attempt to block such malicious activities 14 by identifying and removing the resources 14 comprising the assets of the user 12.

A frequent tactic utilized by malicious users 12 to evade detection involves registering many user accounts on a service 16 and redundantly storing or utilizing the entire set of assets, or a subset thereof, in each user account. For example, if the malicious activity 14 involves three different resources 18, the malicious user 12 may store all three resources 18 in many user accounts, or may store each of the first resource 18, the second resource 18, and the third resource 18 as individual resources 18 in many user accounts. The redundant use of many user accounts may allow the malicious user 12 to continue performing the malicious activity 14 even if some of the user accounts are disabled and some resources 18 are removed. Additionally, the malicious user 12 may vary the contents of a resource 18 (e.g., by creating many versions of a template of a spam email message that differ in insignificant ways), so that even if a particular resource 18 is identified as an asset used in a malicious activity 14. Therefore, techniques devised to detect patterns of malicious activity 14 that consider only the contents of the resources 18 may be unable to detect malicious activities 14 designed in a more sophisticated and robust manner. Finally, even if an automated detection of malicious activity 14 may be effectively achieved, the blocking of such malicious activities 14 may be inadequate if the response to such detected malicious activity 14 involves the review and/or intervention of a user 12, such as an administrator of the service 16. For example, a malicious user 12 may be able to create user accounts and upload resources 18 to a service 16 at least as quickly as the administrator of the service 16 may detect and disable such services 16. However, less sophisticated automated techniques may be less capable of distinguishing legitimate and desirable activities 14 from malicious and undesirable activities 14. For example, an automated technique only focuses on the resources 18 used in a malicious activity 14, but if a malicious user 12 may utilize a particular resource 18 such as a decryption utility, the automated technique may incorrectly ban other users 12 who legitimately invoke the decryption utility.

The techniques presented herein may be particularly effective for detecting and remediating the malicious activities 14 involving these tactics. This effectiveness may derive from the identification of frequent patterns of activity 14 based on the activities 14 as well as the particular resources 18 involved, because a malicious activity 14 may involve a set of otherwise legitimate activities 14 performed on an otherwise legitimate set of resources 18. For example, a first set of users 12 may (as a first activity 14 involving a first resource 18) receive and store a spam email message that is sent to the email account of the user 12, and may (as a second activity 14 involving a second resource 18) invoke a sendmail utility to send legitimate email messages to other users. However, a second set of users 12 may (as a third activity 14 involving the first resource 18 and the second resource 18) invoke the sendmail utility to send the spam email message to spam recipients. By evaluating the combination of the activity 14 and the resources 18 involved, the techniques presented herein may automatically identify the malicious frequent activity 32 and ban the second group of users 12, but not the legitimate frequent activity 32 of the first group of users 12. However, those of ordinary skill in the art may devise many scenarios wherein the techniques presented herein may be utilized.

A second aspect that may vary among embodiments of these techniques relates to the detection of activities 14 involving particular resources 18 and the recording 46 of such activities 14 in an activity log 68. As a first example, the identification of an activity 14 and one or more resources 18 may be performed in various ways. One embodiment of these techniques may generate a signature of various activities 14 and/or resources 18, such as a hashcode of respective objects utilized by an activity 14, in order to track the identification thereof. The embodiment may therefore record an activity 14 by computing a signature (such as a hashcode generated by a hashcode generator) of the activity 14 and the at least one resource 18, and recording the user 12 and the activity 14 in the activity log 68. This general-purpose technique may be applied uniformly regardless of the type of activity 14 and/or resource 18. However, some users 12 may disguise the activities 14 and/or resources 18 from such detection by introducing non-significant differences. In a first such variation, different types of activity 14 may be performed that differ in non-substantive ways in order to avoid detection, but that involve the same result. For example, a malicious user 12 may generate many variations of a maliciously crafted script, and a polymorphic virus may make significant alterations to the code. In a second such variation, the resources 18 utilized by the activity 14 may also be altered in many ways, such as generating many versions of a template of a spam email message, or by encoding an image included in a spam email message using a variety of image encoding algorithms. Therefore, rather than directly computing a signature of an activity 14 and/or resource 18, if a resource 18 is of an identifiable resource type, an embodiment may compute the signature as a content fingerprint that may identify significant features of the resource 18 regardless of non-significant alterations or variations. The embodiment may therefore record an activity 14 by invoking a content fingerprint generator to generate a content fingerprint for respective resources 18 (based on the resource type of the resource 18), and storing the content fingerprint.

As a second example of this second aspect, the activity log 68 may be implemented in many ways. As a first such variation, the activity log 68 may comprise a text document comprising records stored as text (as in a conventional server log), or a database storing records comprising records in a database table. As a second such variation, the embodiment may include an activity index generator (such as a hashcode generator), and respective activities 14 involving particular resources 18 may be stored in the activity log 68 in an indexed manner, according to an activity index computed by the activity index generator for the activity 14 and/or the resources 18 utilized. The implementation of the activity log 68 as an index may facilitate the rapid storage and evaluation of activities 14 and/or resources 18.

Figure 6:
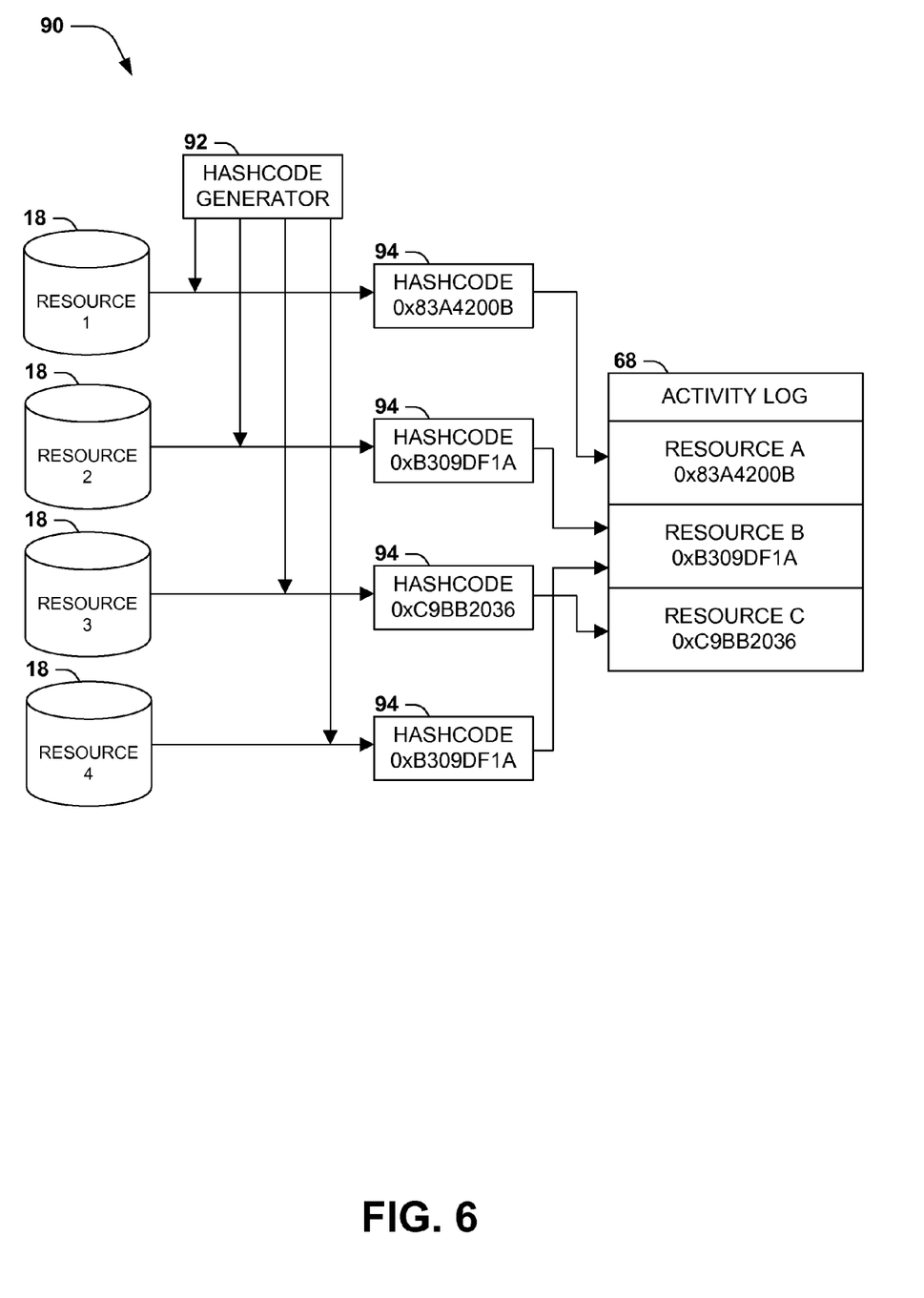
FIG. 6 is an illustration of an exemplary scenario featuring an identification of resources according to signatures generated by a signature generator.

FIG. 6 presents an exemplary scenario 90 featuring an indexing of resources 18 utilized in one or more activities 14 that are recorded and monitored according to the techniques presented herein. In this exemplary scenario 90, an embodiment of these techniques comprises a hashcode generator 92 that is configured to, for respective resources 18 involved in an activity 14, generate a hashcode 94 (e.g., based on the binary contents of the resource 18). The activity log 68 therefore records the resources 18 involved in one or more activities 14 according to the hashcodes 94 generated therefore. This technique may facilitate the identification of equivalent resources 18, such as duplicate instances of a resource 18. For example, in the exemplary scenario 90 of FIG. 6, the second resource 18 and the fourth resource 18 may be stored in different locations (e.g., having been uploaded into different user accounts), but the equivalence of these resources 18 may be identified by recording the resources 18 according to the hashcodes 94 generated therefore, which may illustrate the equivalence of these resources 18. Those of ordinary skill in the art may devise many ways of recording the activities 14 and/or resources 18 while implementing the techniques presented herein.

A third aspect that may vary among embodiments of these techniques relates to the evaluation of the activities 14 involving one or more resources 18 in order to identify frequent activities 32 performed by the users 12. As a first example, the evaluation may be performed continuously, e.g., by a process that continuously examines and identifies the activities 14 of the users 12 in order to identify trendingly frequent activities 32. Alternatively, the evaluation may be performed periodically, e.g., at an evaluation frequency defined by the device 20 (e.g., an hourly or daily evaluation of activities 14). As a second example of this third aspect, the identification of a frequent activity 32 among the activities 14 performed by the users 12 may be defined by the device 20. For example, an embodiment may, for particular activities 14, record an activity counter, comprising the detected number of times the activity 14 has been performed involving a particular set of resources 16. The embodiment may therefore, upon detecting a request to perform the activity 14, increment the activity counter for the activity 14, and may identify frequent activities as those having activity counters that exceed an activity threshold defined by the embodiment (e.g., an activity 14 may be identified as a frequent activity 32 if more than one hundred requests to perform the activity 14 are received within an hour).

As a third example of this third aspect, the storage and/or evaluation of activities 14 may be distributed over many components, such as many computers comprising a server farm or various software processes in a multitasking system. As a first such variation, the activity log 36 may be stored on two or more machines redundantly (e.g., such that a particular activity 14 is recorded on two or more machines or storage devices) and/or distributively (e.g., the activity log 36 comprises a first set of activities 14 recorded on a first machine or storage device, and a second set of activities 14 recorded on a second machine or storage device). As a second variation, the evaluation of activities 14 recorded in an activity log 36 may be distributed across several machines, such that a first machine evaluates a first set of activities 14 and a second machine evaluates a second set of activities 14. As a third variation, the application of activity actions 34 in response to frequent activities 32 may be distributed across several machines. These distribution techniques may be advantageous, e.g., for scaling up the evaluation of activities 14 and application of activity actions 34 to identify frequent activities 32 among a large set of activities 14 performed by the users 12 of the service 16. For example, respective components may be assigned to evaluate a particular subset of activities 14, which may improve the scalability of the evaluation of a large set of activities 14. An activity 14 may therefore be evaluated by first identifying the component assigned to evaluate such activities 14, and by invoking the component to evaluate the activity 14.

Figure 7:
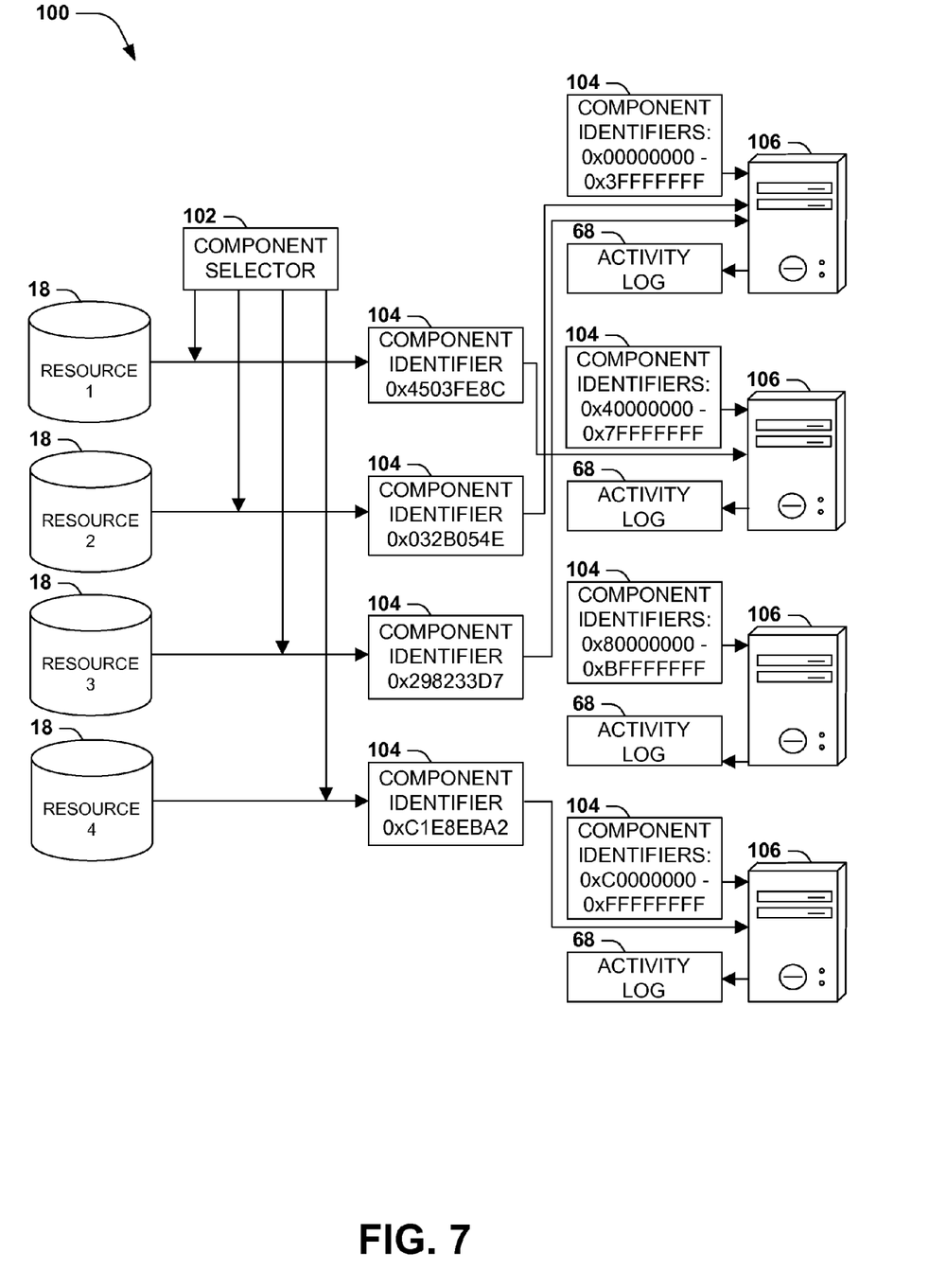
FIG. 7 is an illustration of an exemplary scenario featuring a distribution of the storing and evaluating of activities across a set of components, such as a set of servers comprising a server farm.

FIG. 7 presents an exemplary scenario 100 involving the evaluation of activities 14 in this manner, such that the evaluation is distributed across various components 106 of an embodiment, such as a set of activity evaluation servers in a server set. In this exemplary scenario 100, for respective activities 14, a component identifier 104 may be computed by a component selector 102 (e.g., a hashcode generated by a hashcode generator). Respective components 106 of the embodiment may include a separate activity log 68, and may be configured to evaluate activities 14 identified by a different subset of component identifiers 104 (e.g., different ranges of hashcodes generated by the hashcode generator). In order to evaluate a particular activity 14 involving a particular set of resources 18, the embodiment may invoke the component selector 102 to generate a component identifier 104, and the component 106 assigned to handle activities 14 having a component identifier 104 (e.g., activities 14 having a hashcode within the range of hashcodes assigned to the component 106) may be invoked to evaluate the activity 14 and/or record the activity 14 in the activity log 68. In this manner, the evaluation of activities 14 may be distributed to improve the scalability of the embodiment. The performance of this approach may be further improved by also involving the indexing of activities 14 according to an activity index. For example, for a particular activity 14, a first hashcode may be computed by a first hashcode generator to identify the component 106 assigned to evaluate the activity 14, and a second hashcode may be computed by the component 106 to identify an activity index in the activity log 68 whereby the activity 14 may be recorded. Those of ordinary skill in the art may devise many ways of evaluating activities 14 of users 12 while implementing the techniques presented herein.

A fourth aspect that may vary among embodiments of these techniques relates to the application of activity actions 34 in response to respective activities 14. As a first example, with respect to a particular activity 14 performed by a user 12 and involving at least one resource 18, an activity action 34 may be applied against the user 12 performing the frequent activity 32 (e.g., restricting the user account of the user 12 by warning or banning the users 12 performing the frequent activity 32), the at least one resource 18 involved in the frequent activity 32 (e.g., restricting the resource 18 by censoring, restricting access to, replacing, or deleting the resource 18), and/or the frequent activity 32 (e.g., blocking attempts to perform the frequent activity 32 or degrading the performance of the device 20 in performing the frequent activity 32). Such activity actions may also be applied retroactively, presently, or proactively; e.g., for a frequent activity 32 involving the uploading of an undesirable resource 18, the device 20 may retroactively ban the accounts of users 12 who have previously performed the frequent activity 32, may ban users 12 who are currently performing the frequent activity 32, and/or may monitor future requests of the users 12 in order to ban the account of a user 12 requesting the frequent activity 32 promptly upon receiving the request. Alternatively, the device 20 may periodically review the frequent activities 32 (e.g., once per week), and may ban the accounts of any users found to have performed the frequent activity 32 during the preceding period.

A particular variation of this first example relates to malicious users 12 who utilize automated utilities to perform many malicious activities 14 quickly, such as using scripts or bots that interact with the service 16 in an automated manner. In such scenarios, where a frequent action 32 is detected that might be performed by an automated process, the activity action 34 may restrict the users 12 performing the frequent activity 34 by presenting to the user 12 a user challenge that is configured to authenticate the user 12 as a human actor (e.g., a "captcha" user challenge, such as an image of symbols positioned over a noisy background that is difficult for an automated process to evaluate, such that a user 12 who correctly identifies the symbols is likely to be a human actor). The embodiment may perform the requested activity 14 on behalf of the user 12 only if the user 12 submits a user challenge response that satisfies the user challenge. If the user 12 fails to submit a correct user challenge response, the embodiment may permit the user 12 to try again, may simply refuse to perform the requested activity 14, or may restrict or ban the account of the user 12.

Figure 8:
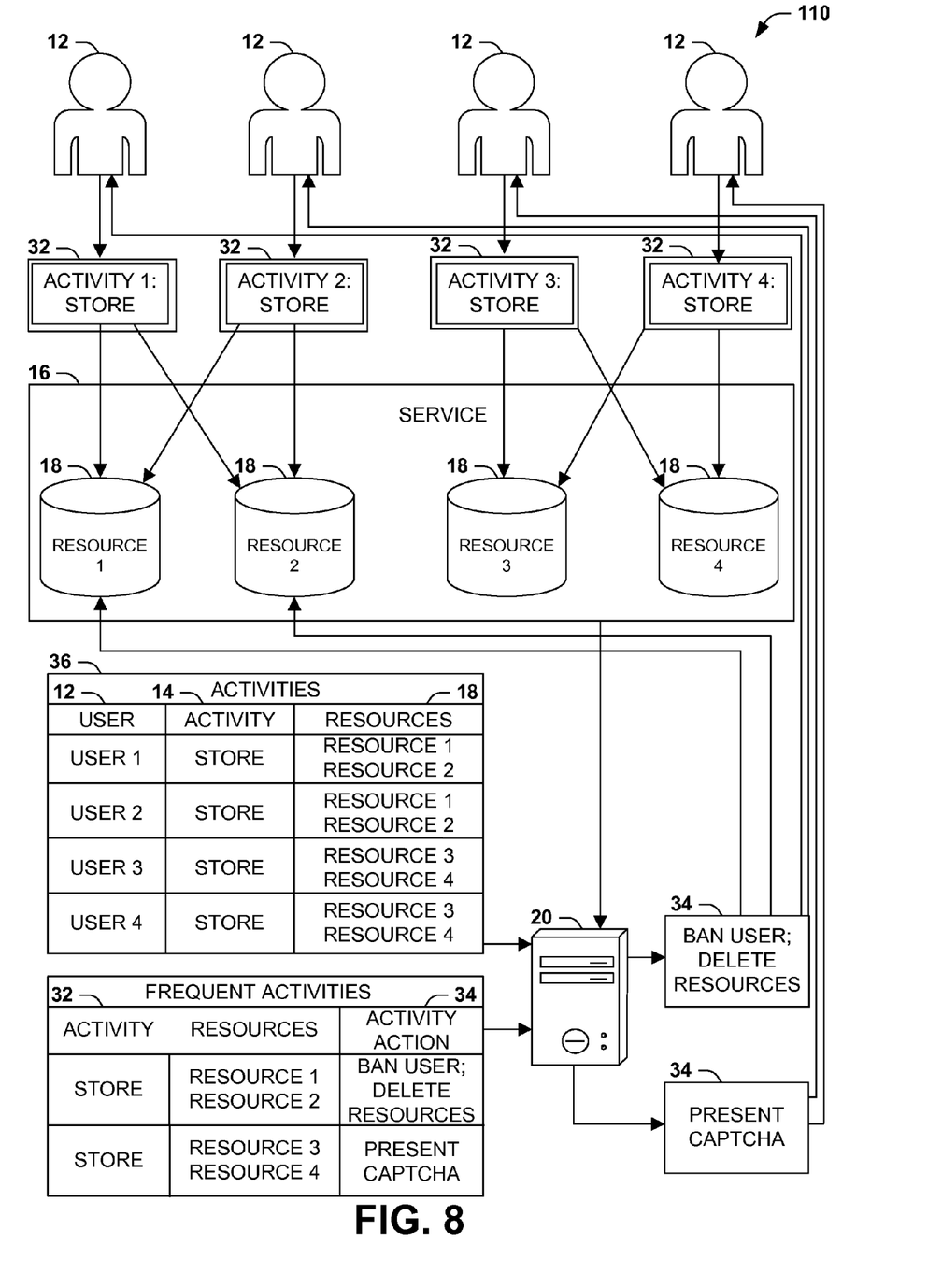
FIG. 8 is an illustration of an exemplary scenario featuring the application of various activity actions to various users, resources, and activities.

FIG. 8 presents an illustration of an exemplary scenario 110 featuring several variations in the application of activity actions 34 in response to various malicious frequent activities 32. In this exemplary scenario 110, a set of malicious users 12 request various activities 14 using various resources 18 of a service 16 (e.g., files uploaded to a file sharing service). A device 20 configured according to the techniques presented herein may record the activities 14 of the users 12 in an activity log 36, and may evaluate the activities 14 to identify frequent activities 32. In this exemplary scenario, a first user 12 and a second user 12 request to perform a first malicious frequent activity 32 using a particular set of resources 18. The device 20 therefore applies a first activity action 34 in response to the first malicious frequent activity 32. In particular, this first frequent activity action 34 is applied both to the users 12 by banning the user accounts of the users 12, and to the resources 18 by deleting the resources 18 from the service 16. Additionally, a third user 12 and a fourth user 12 perform a second malicious frequent activity 32 using a different set of resources 18. The device 20 may therefore apply to these users 12 an activity action 34 involving a user challenge (e.g., a "captcha") that verifies that each user 12 comprises a human agent rather than an automated process, and may be configured to apply the activities 14 only upon receiving from the users 12 a user challenge response that satisfies the user challenge. In this manner, the device 20 applies a set of activity actions 34 against various users 12, resources 18, and/or activities 14.

As a second example of this fourth aspect, the activity action 34 may involve notifying a user 12 of the device 20 (e.g., an administrator of the service 16) of the frequent activity 32. For example, the embodiment may generate a notification for the user 12 indicating the frequent activity 32 and the resources 18 involved in the activity 14, and also possibly including other information, such as the user accounts of the users 12 performing the frequent activity 32, the dates and times of the frequent activities 32, the internet protocol (IP) addresses of such users 12, and any other activities 14 performed by these users 12. The embodiment may actively notify the user 12 (e.g., by presenting a pop-up notification for the user in an administrative interface) and/or passively notify the user 12 (e.g., by sending an email message, or by presenting the notification only upon the request of the user 12).

As a further variation of this second example, the embodiment may also present to the user 12 at least one suggested activity action that is recommended for application to the frequent activity 32. For example, if the frequent activity 32 is likely to be desirable, the embodiment may present to the user 12 a set of activity actions 18 that encourage the frequent activity 32, such as identifying the frequent action 32 to other users 12 of the service 16 (e.g., including a frequently viewed media object in a list of media objects recommended to users 12 of a media sharing service) or rewarding the users 12 performing the frequent action 32. If the frequent activity 32 is likely to be undesirable, the embodiment may present to the user 12 a set of activity actions 18 that discourage the frequent activity 32, such as warning or banning the user(s) 12 performing the frequent activity 32 or blocking the performance of the frequent activity 32. If the nature of the frequent activity 32 is indeterminate, the embodiment may present a range of suggestions to the user 12, and/or may offer to perform a further evaluation of the frequent activity 32 (e.g., a more sophisticated analysis of resources 18 involved in the frequent activity 32, the other activities 14 of the users 12 performing the frequent activity 32, and/or the consequences of the frequent activity 32) or simply to continue monitoring and reporting on the frequent activity 32.

As a still further variation of this second example, an embodiment may allow the user 12 to select from the suggested activity actions an activity action 34 to be applied to the frequent activity 32, and may apply the selected activity action 34 to the frequent activity 32, possibly including the activity action 34 for application to future attempts by users 12 to perform the frequent activity 32. In this manner, the device may include the interaction of a user 12 (such as an administrator of the service 16) in determining the activity actions 18 to be automatically applied to a frequent activity 32. Those of ordinary skill in the art may devise many types of activity actions 34 and applications to frequent activities 32 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
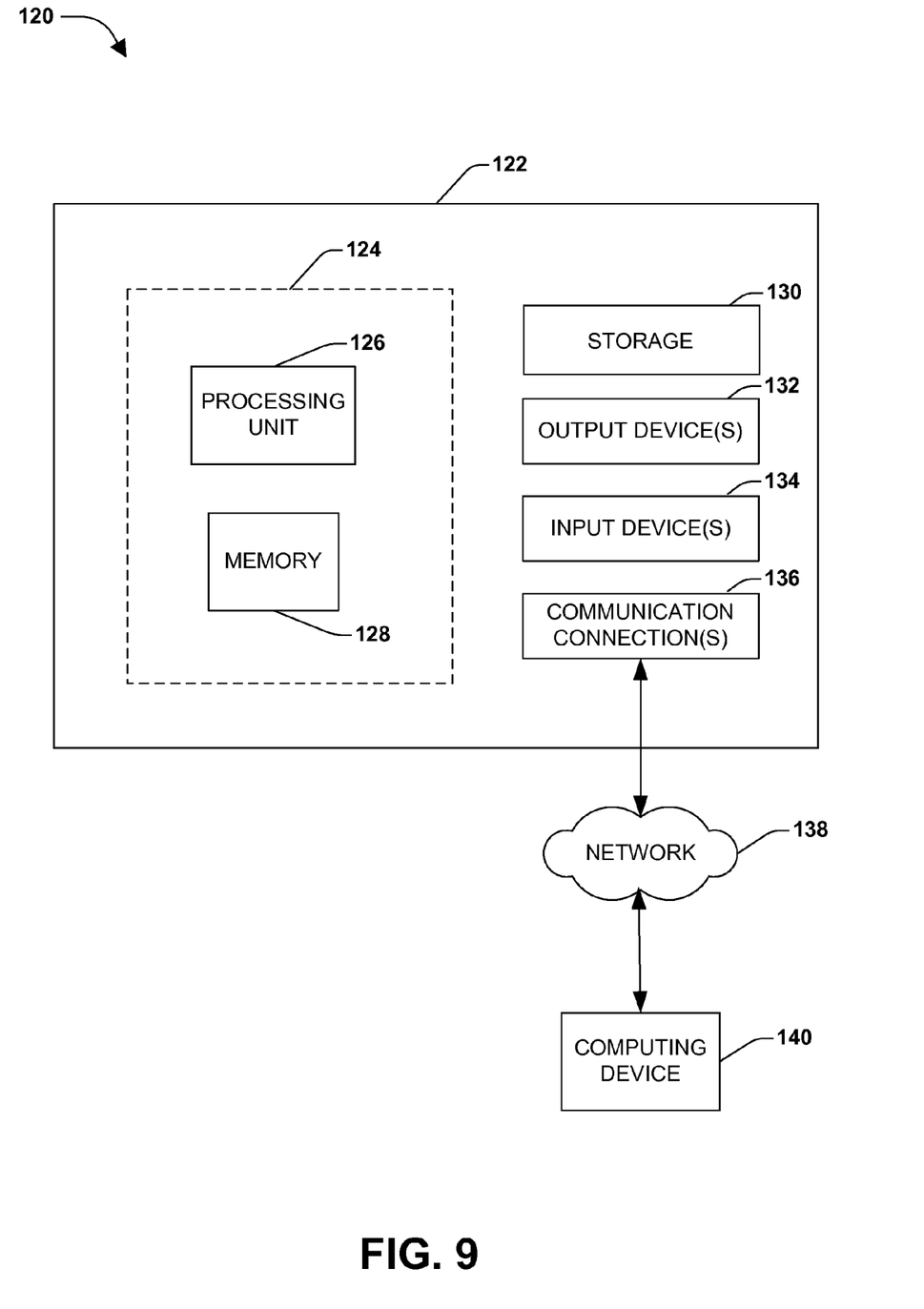
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 120 comprising a computing device 122 configured to implement one or more embodiments provided herein. In one configuration, computing device 122 includes at least one processing unit 126 and memory 128. Depending on the exact configuration and type of computing device, memory 128 may be volatile (such as RAM, for example), non-volatile (such as ROM, flash memory, etc., for example) or some combination of the two. This configuration is illustrated in FIG. 9 by dashed line 124.

In other embodiments, device 122 may include additional features and/or functionality. For example, device 122 may also include additional storage (e.g., removable and/or non-removable) including, but not limited to, magnetic storage, optical storage, and the like. Such additional storage is illustrated in FIG. 9 by storage 130. In one embodiment, computer readable instructions to implement one or more embodiments provided herein may be in storage 130. Storage 130 may also store other computer readable instructions to implement an operating system, an application program, and the like. Computer readable instructions may be loaded in memory 128 for execution by processing unit 126, for example.

The term "computer readable media" as used herein includes computer storage media. Computer storage media includes volatile and nonvolatile, removable and non-removable media implemented in any method or technology for storage of information such as computer readable instructions or other data. Memory 128 and storage 130 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 122. Any such computer storage media may be part of device 122.

Device 122 may also include communication connection(s) 136 that allows device 122 to communicate with other devices. Communication connection(s) 136 may include, but is not limited to, a modem, a Network Interface Card (NIC), an integrated network interface, a radio frequency transmitter/receiver, an infrared port, a USB connection, or other interfaces for connecting computing device 122 to other computing devices. Communication connection(s) 136 may include a wired connection or a wireless connection. Communication connection(s) 136 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 122 may include input device(s) 134 such as keyboard, mouse, pen, voice input device, touch input device, infrared cameras, video input devices, and/or any other input device. Output device(s) 132 such as one or more displays, speakers, printers, and/or any other output device may also be included in device 122. Input device(s) 134 and output device(s) 132 may be connected to device 122 via a wired connection, wireless connection, or any combination thereof. In one embodiment, an input device or an output device from another computing device may be used as input device(s) 134 or output device(s) 132 for computing device 122.

Components of computing device 122 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 122 may be interconnected by a network. For example, memory 128 may be comprised of multiple physical memory units located in different physical locations interconnected by a network.

Those skilled in the art will realize that storage devices utilized to store computer readable instructions may be distributed across a network. For example, a computing device 130 accessible via network 138 may store computer readable instructions to implement one or more embodiments provided herein. Computing device 122 may access computing device 130 and download a part or all of the computer readable instructions for execution. Alternatively, computing device 122 may download pieces of the computer readable instructions, as needed, or some instructions may be executed at computing device 122 and some at computing device 130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of evaluating activities of users involving user-accessible resources on a device having a processor and having access to an activity log, the method comprising:
   executing, on the processor, instructions that cause the device to:
   responsive to detecting an instance of an activity performed by a selected user involving at least one user-accessible resource specified by the activity, record, in the activity log, the instance of the activity and the at least one user-accessible resource specified by the activity;
   evaluate the activity log to:
   determine a frequency of instances of respective activities performed by the users with at least one user-accessible resource, and
   among the respective activities, identify a frequent activity where instances of the frequent activity in the activity log have been performed with a frequency above a frequency threshold; and
   for respective frequent activities, identify an activity action to be applied in response to the frequent activity; and
   responsive to receiving a request to perform a requested activity specifying a user-accessible resource:
   compare the requested activity and the user-accessible resource specified by the requested activity with the frequent activity; and
   responsive to identifying the requested activity and the user-accessible resource specified by the requested activity as the frequent activity, perform the activity action associated with the frequent activity.

2. The method of claim 1:
   the device comprising a data store;
   at least one user-accessible resource comprising at least one data object; and the activity performed by the selected user comprising: sending to the device the data object to be stored in the data store.

3. The method of claim 1, recording the activity and the at least one user-accessible resource comprising:
computing a signature of the activity and the at least one user-accessible resource, and
recording the selected user and the signature in the activity log.

4. The method of claim 3:
the device comprising at least one hashcode generator; and
the signature for a user-accessible resource comprising a content hashcode generated by a hashcode generator for the user-accessible resource.

5. The method of claim 3:
respective user-accessible resources comprising a resource type;
the device comprising at least one content fingerprint generator for user-accessible resources of a resource type; and
the signature for a user-accessible resource comprising a content fingerprint of the user-accessible resource generated by a content fingerprint generator for resources of the resource type of the user-accessible resource.

6. The method of claim 1, wherein executing the instructions on the processor further causes the device to:
generate, for respective activities involving at least one user-accessible resource, an activity index; and
for respective activities involving at least one user-accessible resource, index the activity according to the activity index generated for the activity and the at least one user-accessible resource.

7. The method of claim 1:
the device defining an evaluation frequency; and
evaluating the activity log comprising: periodically evaluating the activity log at the evaluation frequency.

8. The method of claim 1:
the device defining an activity threshold for the frequent activity;
recording the activity and the at least one user-accessible resource comprising:
responsive to the request to perform an activity with at least one user-accessible resources, incrementing an activity counter for the activity; and
identifying the frequent activity further comprising: determining that the activity counter for the activity exceeds the activity threshold within a designated time range.

9. The method of claim 1:
executing the instructions further causes the device to, for respective activities involving at least one user-accessible resource:
among at least two components, identify a selected component that evaluates the activity involving at least one user-accessible resource, and
invoke the selected component to evaluate the activity involving the at least one user-accessible resource.

10. The method of claim 9, wherein:
executing the instructions on the processor further causes the device to generate, for respective activities involving at least one user-accessible resource, a component identifier; and
identify the component that evaluates an activity involving at least one user-accessible resource comprising:
invoking a component selector to generate a component identifier for the activity involving the at least one user-accessible resource;
identifying an identified component that is associated with the component identifier; and
invoking the identified component to evaluate the activity involving the at least one user-accessible resource.

11. The method of claim 1, the activity action comprising:
notifying at least one selected user of the device regarding the frequent activity.

12. The method of claim 11, the activity action comprising:
presenting to the selected user at least one suggested activity action to be applied in response to the frequent activity; and
responsive to receiving from the selected user from among the at least one suggested activity action a selected activity action, applying the selected activity action in response to the frequent activity.

13. The method of claim 1:
at least one activity comprising a desirable activity involving at least one user-accessible resource; and
the activity action for the desirable activity comprising:
presenting to a selected user of the device at least one frequent activity involving the at least one user-accessible resource as a desirable activity.

14. The method of claim 1:
at least one activity comprising an undesirable activity involving at least one user-accessible resource; and
the activity action for an undesirable activity comprising:
restricting users performing the undesirable activity involving the at least one user-accessible resource.

15. The method of claim 14:
at least one activity comprising an undesirable activity involving at least one user-accessible resource; and
executing the instructions further causes the device to restrict the at least one user-accessible resource involved in the undesirable activity.

16. The method of claim 15, applying the activity action in response to an undesirable activity involving at least one user-accessible resource comprising: applying the activity action to users accessing the user-accessible resource involved in the undesirable activity.

17. The method of claim 14, restricting a selected user comprising, responsive to detecting a selected user performing an undesirable activity:
present to the selected user a user challenge that authenticates the selected user as a human actor, and
responsive to receiving from the selected user a user challenge response satisfying the user challenge, performing the undesirable activity on behalf of the selected user.

18. The method of claim 14, restricting a selected user performing an undesirable activity comprising: responsive to detecting a selected user performing the undesirable activity, apply the activity action to the undesirable activity.

19. A system that evaluates activities of users involving user-accessible resources of a device having a processor, the system comprising:
a computer memory storing instructions that, when executed on the processor, implement:
an activity log storing an activity involving at least one user-accessible resource;
an activity recording component that, responsive to detecting an instance of an activity performed by a selected user involving at least one user-accessible resource specified by the activity, records, in the activity log, the instance of the activity and the at least one user-accessible resource specified by the activity;
an activity evaluating component that evaluates the activity log to:

determine a frequency of instances of respective activities performed by the users with at least one user-accessible resource, and among the respective activities, identify at least one frequent activity where instances of the frequent activity in the activity log have been performed with a frequency above a frequency threshold;

for respective frequent activities, identify an activity action to be applied in response to the frequent activity; and responsive to receiving a request to perform a requested activity specifying a user-accessible resource:

compare the requested activity and the user-accessible resource specified by the requested activity with the frequent activity; and responsive to identifying the requested activity and the user-accessible resource specified by the requested activity as the frequent activity, perform the activity action associated with the frequent activity.

20. A method of evaluating activities of users involving user-accessible resources on a device having a processor and having access to an activity log, the method comprising:

executing on the processor instructions that cause the device to:

responsive to detecting an instance of an activity performed by a first user involving at least one user-accessible resource specified by the activity, record in the activity log the activity and the at least one user-accessible resource specified by the activity;

evaluate the activity log to:

determine a frequency of instances of respective activities performed by the users with at least one user-accessible resource, and identify, among the respective activities, a frequent activity involving at least one user-accessible resource specified by the frequent activity, and where instances of the frequent activity with the at least one resource by a user set including the first user occur in the activity log with a frequency above a frequency threshold;

for the frequent activity, identify an activity action to be applied in response to the frequent activity; and responsive to receiving a request, from a second user not included in the user set, to perform a requested activity specifying a user-accessible resource:

compare the requested activity and the user-accessible resource specified by the requested activity with the frequent activity; and responsive to identifying the requested activity and the user-accessible resource specified by the requested activity as the frequent activity, apply the activity action associated with the frequent activity to the second user.

* * * * *